United States Patent
Warpup et al.

(10) Patent No.: US 9,523,517 B2
(45) Date of Patent: Dec. 20, 2016

(54) SOLAR PANEL MOUNTING STRUCTURE

(71) Applicants: Ryan Robert Warpup, Troy, MI (US); Mark Francis Werner, LaSalle (CA); Eric Anthony Powrozek, Warren, MI (US); Peter Mykolaj Szadyr, Lake Orion, MI (US); David Wayne Cummings, Macomb Township, MI (US)

(72) Inventors: Ryan Robert Warpup, Troy, MI (US); Mark Francis Werner, LaSalle (CA); Eric Anthony Powrozek, Warren, MI (US); Peter Mykolaj Szadyr, Lake Orion, MI (US); David Wayne Cummings, Macomb Township, MI (US)

(73) Assignee: Magna International Inc. (CA)

( * ) Notice: Subject to any disclaimer, the term of this patent is extended or adjusted under 35 U.S.C. 154(b) by 0 days.

(21) Appl. No.: 14/384,294

(22) PCT Filed: Mar. 13, 2013

(86) PCT No.: PCT/US2013/030797
§ 371 (c)(1),
(2) Date: Sep. 10, 2014

(87) PCT Pub. No.: WO2013/138444
PCT Pub. Date: Sep. 19, 2013

(65) Prior Publication Data
US 2015/0034575 A1  Feb. 5, 2015

Related U.S. Application Data

(60) Provisional application No. 61/611,217, filed on Mar. 15, 2012.

(51) Int. Cl.
H02S 20/10 (2014.01)
F24J 2/52 (2006.01)
H01L 31/042 (2014.01)

(52) U.S. Cl.
CPC ............... *F24J 2/5245* (2013.01); *F24J 2/523* (2013.01); *F24J 2/525* (2013.01); *F24J 2/526* (2013.01);
(Continued)

(58) Field of Classification Search
CPC .......... H02S 20/10; H02S 20/00; H01L 31/05; F24J 2/5243; F24J 2/525; F24J 2/5232; F24J 2/5226; F24J 2/523; F24J 2/5258; F24J 2/5264; F24J 2/5229; F24J 2/5233; F24J 2/5239; F24J 2/5201; F24J 2/5205; F24J 2/52; F24J 2/38; F24J 2002/385; F24J 2002/1095; F24J 2002/4601; F24J 2002/0069; F24J 2002/0046; F24J 2/5245; Y02E 10/47
(Continued)

(56) References Cited

U.S. PATENT DOCUMENTS 4,269,173 A * 5/1981 Krueger et al. ............... 126/634
5,125,608 A   6/1992 McMaster et al.
(Continued)

FOREIGN PATENT DOCUMENTS

CN    202058760 U    11/2011
DE    202006014047 U1    12/2006
(Continued)

*Primary Examiner* — Joshua Rodden
*Assistant Examiner* — Hiwot Tefera
(74) *Attorney, Agent, or Firm* — Dickinson Wright PLLC

(57) ABSTRACT

A mounting structure for a solar panel assembly, having a plurality of solar panels, includes a plurality of vertical support legs and a grid assembly. The grid assembly includes a plurality of north-south members and the east- (Continued)

west members. The plurality of north-south members include a plurality of elongated slots to allow attachment to the vertical support legs despite any manufacturing tolerances that may exist in the components. The plurality of east-west members include a plurality of elongated slots to allow attachment to the north-south members despite any manufacturing tolerances that may exist in the components.

7 Claims, 7 Drawing Sheets

(52) U.S. Cl.
CPC .............. *F24J 2/5232* (2013.01); *H02S 20/00* (2013.01); *H02S 20/10* (2014.12); *F24J 2/5264* (2013.01); *Y02E 10/47* (2013.01); *Y02E 10/50* (2013.01)

(58) Field of Classification Search
USPC .... 211/41.1; 52/173.3, 126.1; 126/608, 600, 126/703
See application file for complete search history.

(56) References Cited

U.S. PATENT DOCUMENTS

| | | | |
|---|---|---|---|
| 5,127,760 A * | 7/1992 | Brady .................... | E04B 2/825 403/230 |
| 5,743,063 A | 4/1998 | Boozer | |
| 8,181,419 B1 * | 5/2012 | diGirolamo ............. | E04B 2/768 248/909 |
| 8,291,653 B2 * | 10/2012 | Suarez et al. ................ | 52/173.3 |
| 8,407,961 B2 * | 4/2013 | Kemple et al. ............ | 52/506.03 |
| 8,550,419 B2 * | 10/2013 | Hausner ................ | F24J 2/5232 126/696 |
| 8,763,346 B2 * | 7/2014 | Kuster .................. | F24J 2/5232 126/621 |
| 8,882,073 B2 * | 11/2014 | Habdank et al. ............ | 248/419 |
| 8,939,648 B2 * | 1/2015 | Schneider ................ | F24J 2/541 384/428 |
| 9,117,951 B2 * | 8/2015 | Park ........................ | H02S 20/30 |
| 2008/0011921 A1 | 1/2008 | Aramaki et al. | |
| 2008/0121273 A1 * | 5/2008 | Plaisted ................... | F16L 3/127 136/251 |
| 2009/0139176 A1 * | 6/2009 | Schroeder, Sr. .......... | E04B 5/10 52/656.1 |
| 2009/0145423 A1 | 6/2009 | Carcangiu et al. | |
| 2009/0256046 A1 * | 10/2009 | Hausner ................ | F24J 2/5232 248/398 |
| 2010/0077679 A1 * | 4/2010 | Sagayama .................... | 52/173.3 |
| 2010/0132274 A1 * | 6/2010 | Reyal et al. ................. | 52/173.3 |
| 2010/0132769 A1 * | 6/2010 | Potter ..................... | E04H 6/025 136/251 |
| 2010/0236183 A1 * | 9/2010 | Cusson .................. | F24J 2/5207 52/645 |
| 2011/0067749 A1 | 3/2011 | Zuritis | |
| 2011/0072741 A1 * | 3/2011 | Kemple et al. ............. | 52/173.3 |
| 2011/0233157 A1 * | 9/2011 | Kmita .................... | F24J 2/5233 211/41.1 |
| 2011/0272367 A1 * | 11/2011 | Kufner .......................... | 211/41.1 |
| 2011/0309215 A1 * | 12/2011 | Lu et al. ....................... | 248/165 |
| 2012/0017526 A1 * | 1/2012 | Eide ............................. | 52/173.3 |
| 2012/0037214 A1 * | 2/2012 | Sagayama ................ | F24J 2/5232 136/251 |
| 2012/0091077 A1 * | 4/2012 | Zuritis, Michael .......... | 211/41.1 |
| 2012/0132262 A1 * | 5/2012 | Sagayama ............... | H02S 20/00 136/251 |
| 2012/0175322 A1 * | 7/2012 | Park ........................ | F24J 2/5232 211/41.1 |
| 2012/0267328 A1 * | 10/2012 | Mcpheeters .................. | 211/41.1 |
| 2013/0008103 A1 * | 1/2013 | Sagayama .................... | 52/173.3 |
| 2013/0139869 A1 * | 6/2013 | Nuernberger ........... | H02S 20/00 136/251 |
| 2014/0069483 A1 * | 3/2014 | Wolter ................ | H01L 31/0422 136/246 |
| 2014/0182663 A1 * | 7/2014 | Kuo .................... | H01L 31/0422 136/251 |

FOREIGN PATENT DOCUMENTS

| | | |
|---|---|---|
| DE | 202008005020 U1 | 9/2008 |
| DE | 202009006970 U1 | 8/2009 |

\* cited by examiner

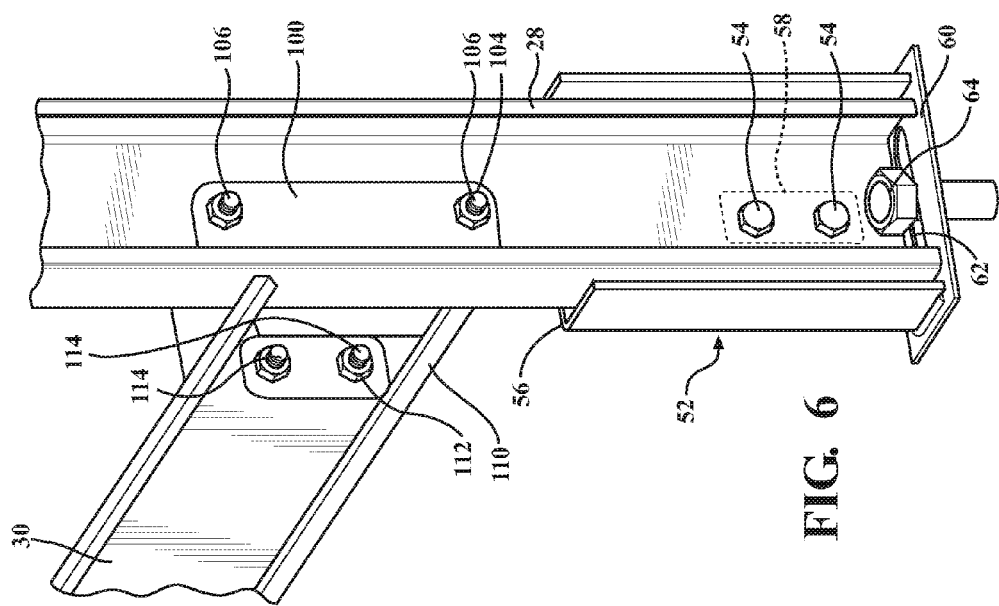
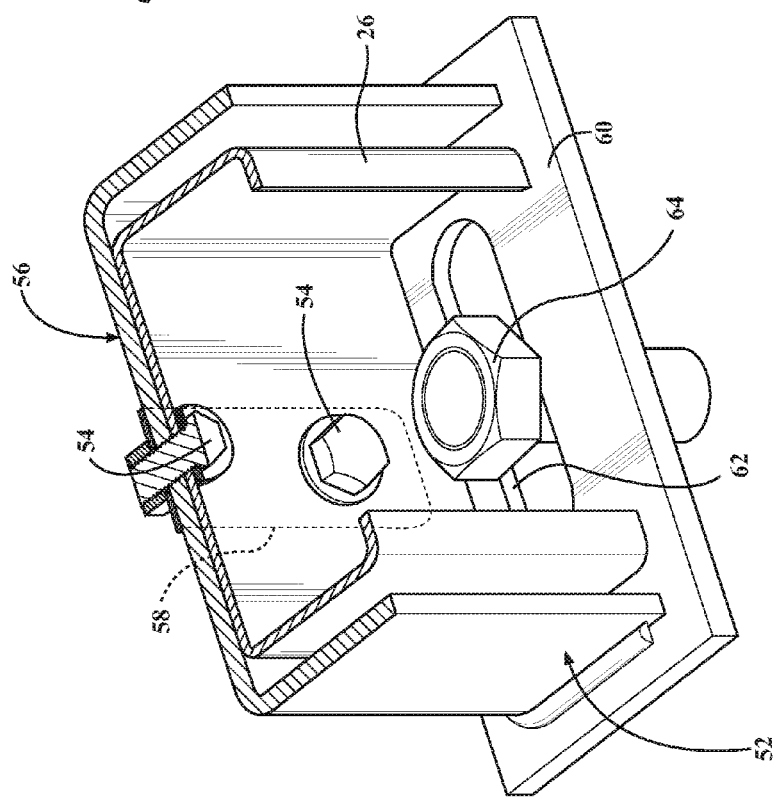

SOLAR PANEL MOUNTING STRUCTURE

CROSS-REFERENCE TO RELATED APPLICATIONS

This U.S. National Stage Patent Application claims the benefit of International Application serial number PCT/US2013/030797 filed Mar. 13, 2013, entitled "Solar Panel Mounting Structure" which claims priority to U.S. Provisional Patent Application Ser. No. 61/611,217, entitled "Solar Panel Mounting Structure", filed Mar. 15, 2012, the entire disclosures of the applications being considered part of the disclosure of this application, and hereby incorporated by reference.

BACKGROUND OF THE INVENTION

1. Field of the Invention

The subject invention is related to a solar panel assembly, and more precisely, to a solar panel assembly including a mounting structure for receiving and retaining solar panels.

2. Description of the Prior Art

Renewable resources are becoming an increasingly popular alternative to non-renewable resources for generating electricity. One renewable resource that can be converted into electricity is solar energy through the use of solar power generators, which harness the potential energy of solar rays from the sun and convert that potential energy into electricity. One type of solar power generator is a photovoltaic (PV) cell, which converts solar radiation into electricity.

PV cells are typically arranged in an array on a solar panel. For maximum effectiveness, the PV panels must remain outdoors, and therefore, they must be resistant to a wide range of environmental factors. Such environmental factors could include high winds, rain, hail and large snow falls. For cost savings purposes, PV panels are typically mounted on a stationary mounting structure which angles the PV panels to receive maximum solar rays throughout the year. Due to seasonal changes of the earth's axis relative to the sun, the optimal angle at which the PV panels should be operated changes continuously. Accordingly, a large amount of potential energy is inherently lost by the stationary PV panels.

Typical solar panels are intended to be mounted in predetermined locations and include mounting structures having a plurality of north-south members and a plurality of east-west members that interconnect with the north-south members to form a rack for receiving and retaining the PV panels. This mounting structure is maintained at an angle by a plurality of front and rear legs that serve to support the mounting structure. These mounting structures are typically installed on one or more predetermined foundation structures. Because of manufacturing tolerances that exist in the various components that make up the mounting structure as well as variances that can exist in the foundation structures, it can be extremely time consuming and laborious to accurately assemble and align the mounting structure and thus the solar panel assembly in the field.

It would therefore be desirable to have a mounting structure that can be easily and securely installed and allows for manufacturing tolerances and other variances to be compensated for during the installation process in the field.

SUMMARY OF THE INVENTION

It is therefore an aspect of the present disclosure to provide a solar panel array assembly that can be readily installed in the field.

It is another aspect of the present disclosure to provide a mounting structure for a solar assembly that allows for the compensation of manufacturing tolerances or variances as part of the manufacturing process.

In accordance with the above and the other aspects, a solar assembly is provided which includes a plurality of solar panels disposed on a mounting structure. The mounting structure includes a plurality of north-south members and a plurality of east-west members secured thereto. The plurality of east-west members have a plurality of elongated slots formed therein such that a fastening member can pass through a respective one of the slots to connect and secure the north-south members to the east-west members despite any manufacturing tolerances that may exist in the components. The mounting structure also includes a plurality of front leg members and a plurality of rear leg members that connect at respective upper ends to the north-south members and connect at lower ends to a plurality of pre-installed foundation structures. A leg mounting bracket is disposed at the connection between each of the foundation structures and the leg members. The leg mounting brackets each include an elongated vertical slot that insures the placement of fastening members utilized to connect the leg members to the foundation structures despite the existence of any manufacturing tolerances and grade variations or slope of the ground at the site location.

In accordance with another aspect, each of the leg mounting brackets includes an elongated horizontal slot that compensates for any manufacturing tolerances as part of the connection of the leg members to the foundation structures by ensuring alignment of the connection openings.

In accordance with still another aspect, the mounting structure includes a plurality of structures that extend between the rear legs and the north-south members. The plurality of structures each have an elongated slot disposed adjacent the connection to the north-south members that allows for flexibility in the placement of the fastening members to also accommodate for manufacturing tolerances.

BRIEF DESCRIPTION OF THE DRAWINGS

Other aspects of the present invention will be readily appreciated, as the same becomes better understood by reference to the following detailed description when considered in connection with the accompanying drawings wherein:

FIG. 5 is a schematic illustration of a connection of a leg member to a foundation structure in accordance with an aspect of the disclosure;

FIG. 6 is a schematic illustration of a connection of a rear leg member to a foundation structure as well as a diagonal reinforcement to a rear leg member in accordance with an aspect of the disclosure;

DETAILED DESCRIPTION OF THE ENABLING EMBODIMENTS

Figure 1:
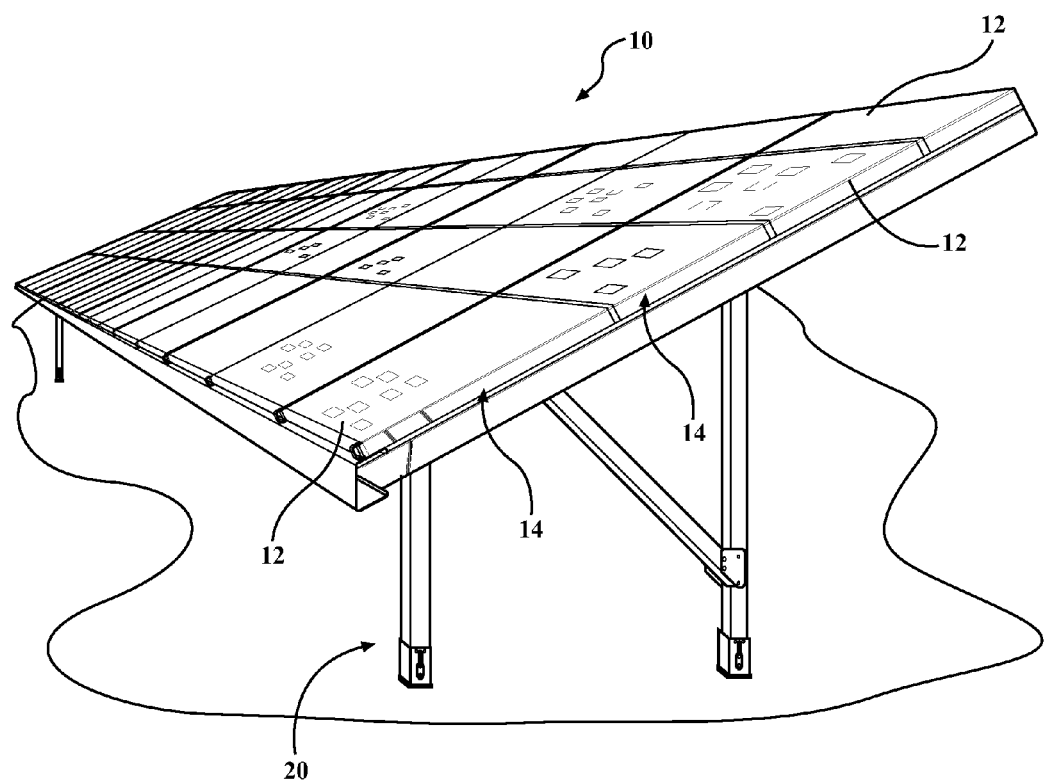
FIG. 1 is a perspective view of a solar array assembly in accordance with an aspect of the disclosure.

Referring to the Figures, wherein like numerals indicate corresponding parts throughout the several views, a solar assembly 10 is generally shown. As best shown in FIG. 1, the solar assembly 10 may include a plurality of panels 12 arranged in a plurality of solar arrays 14. In the exemplary embodiment, each panel 12 can include at least one photovoltaic (PV) cell for receiving sun rays and converting them into electricity. However, it should be appreciated that the solar panels 12 could be any other type of panel for converting sun rays into electricity or any other form of useable energy. It should be appreciated that the solar assembly 10 could include any number of solar arrays 14 and those arrays 14 could be disposed at any desirable angle relative to one another. According to an aspect, the solar arrays 14 are supported and oriented in a predetermined direction and at a predetermined angle by a mounting structure 20. According to an aspect, the solar arrays 14 are installed and maintained at an orientation that maximizes the solar rays captured by the PV panels 12 throughout the year. It is thus important that the mounting structure 20 can be installed and assembled properly so that the solar arrays 14 are properly aligned. However, because of ground unevenness, manufacturing tolerances, and other variables, alignment of the components and their attachment openings can be very difficult thus making installation of the solar assembly 10 a laborious and time consuming process.

Figure 2:
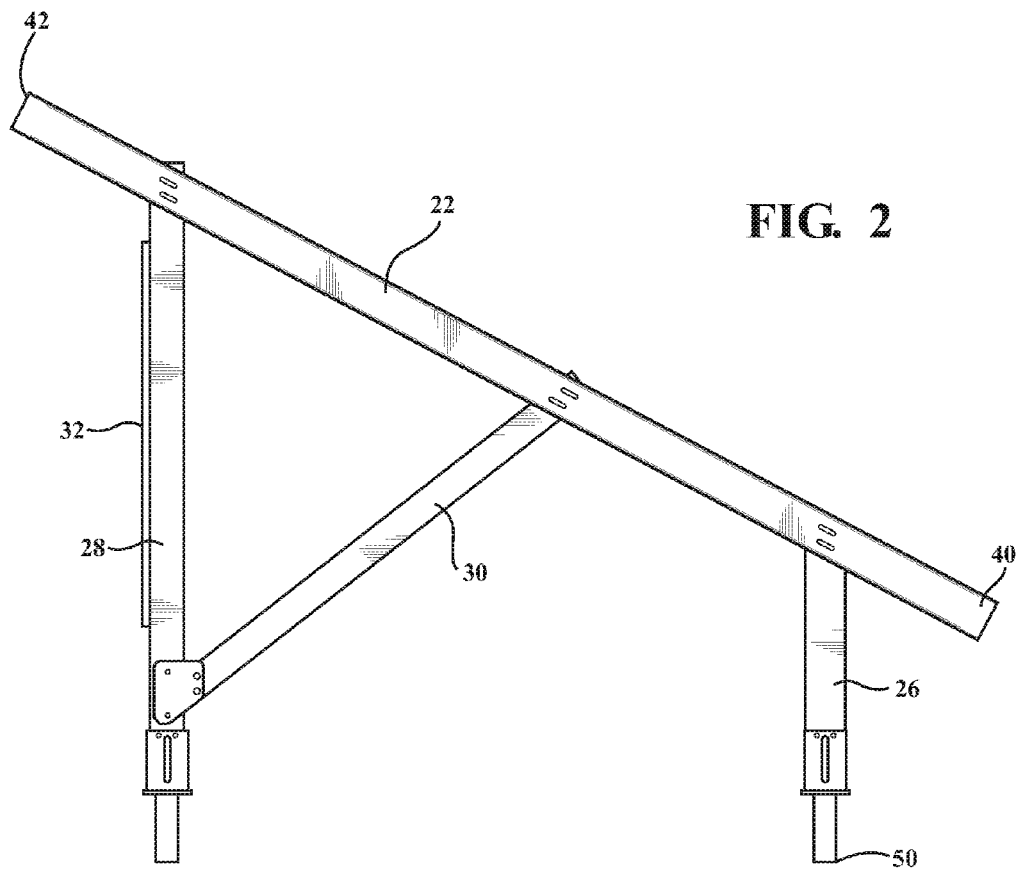
FIG. 2 is a side view of a mounting structure for a solar panel assembly in accordance with an aspect of the disclosure.
Figure 3:
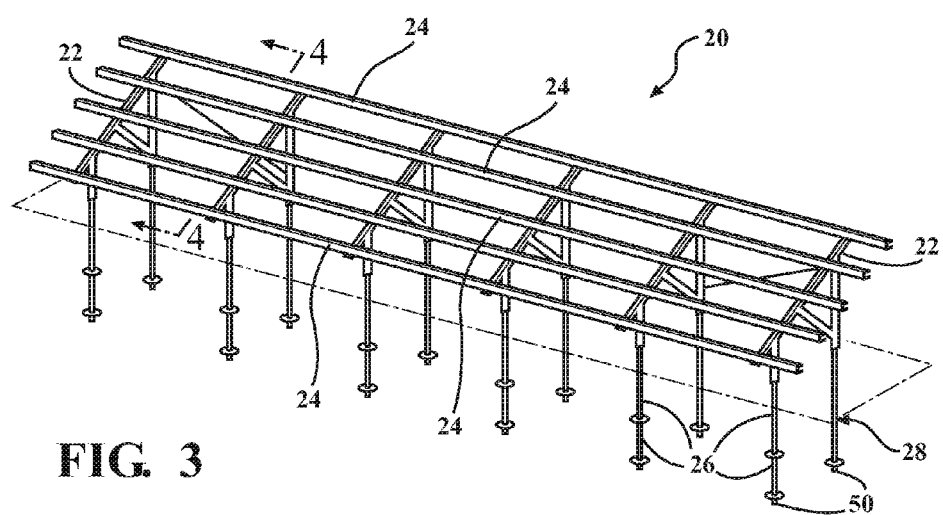
FIG. 3 is a perspective view of a mounting structure for a solar panel assembly in accordance with an aspect of the disclosure.
Figure 4:
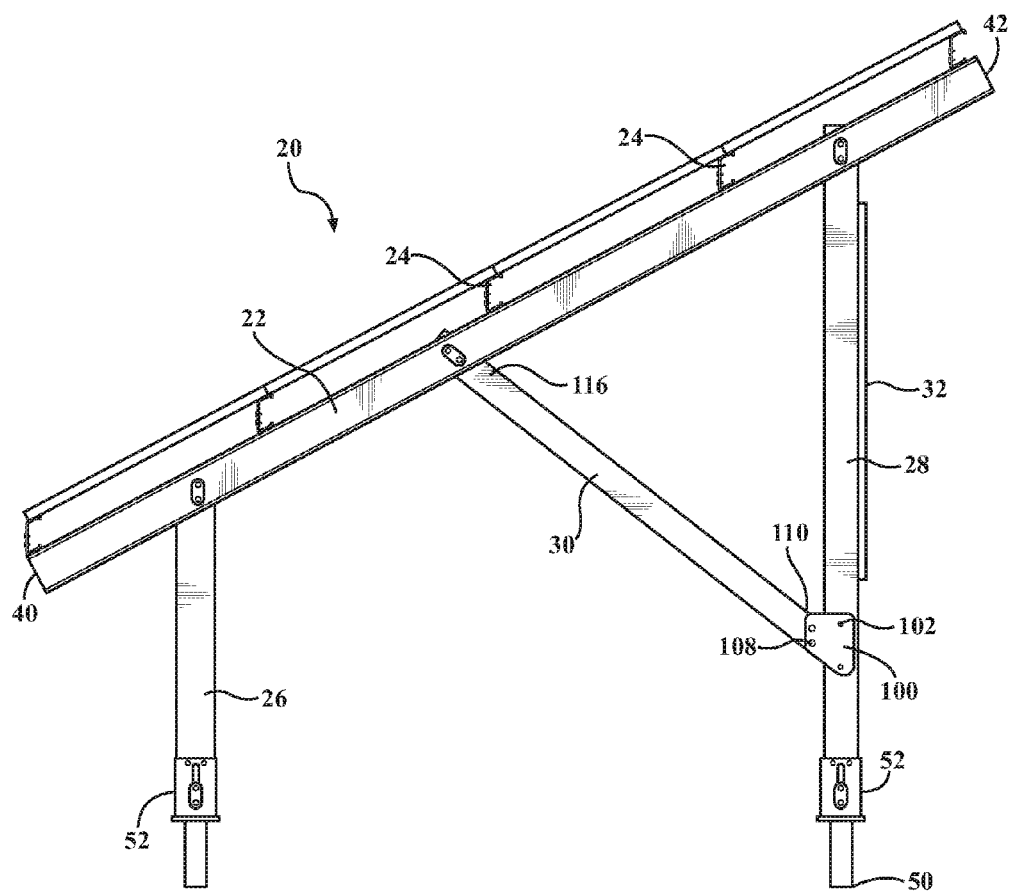
FIG. 4 is a cross-sectional view of the mounting structure of FIG. 3 in the direction of the arrows 4-4.

According to an aspect of the disclosure and with reference specifically to FIGS. 2-4, the mounting structure 20 can include a plurality of north-south members 22, a plurality of east-west members 24, a plurality of front leg members 26, a plurality of rear leg members 28, a plurality of diagonal reinforcements 30, and a plurality of rear support braces 32. The mounting structure 20 may include more or less components as desired. As shown in the Figures, the north-south members 22 may have a forward end 40 and rearward end 42 with a body extending generally therebetween. The body may be angled upward in the direction from the forward end 40 to the rearward end 42 such that the solar panels are positioned at the desired angle. As shown, the mounting structure 20 can have any number of north-south members 22 and they can extend at a variety of different upward angles.

Figure 7:
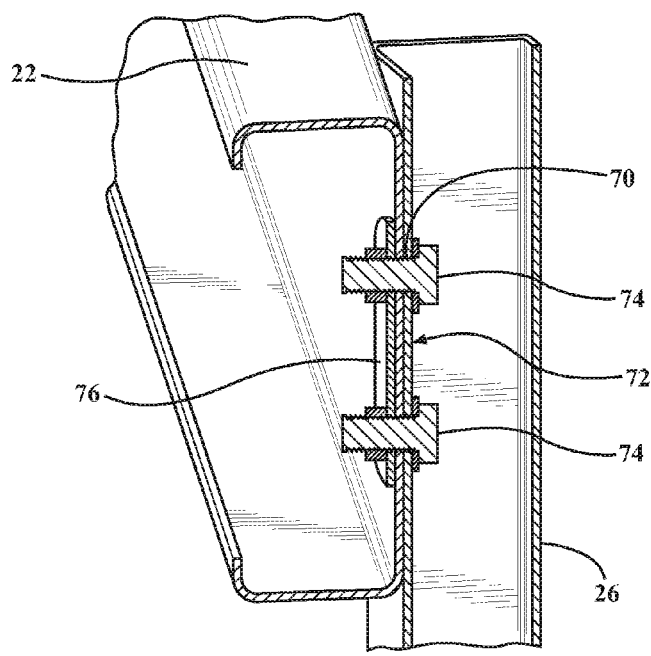
FIG. 7 is a schematic illustration of a connection of a leg member to a north-south member in accordance with an aspect of the disclosure.
Figure 9A:
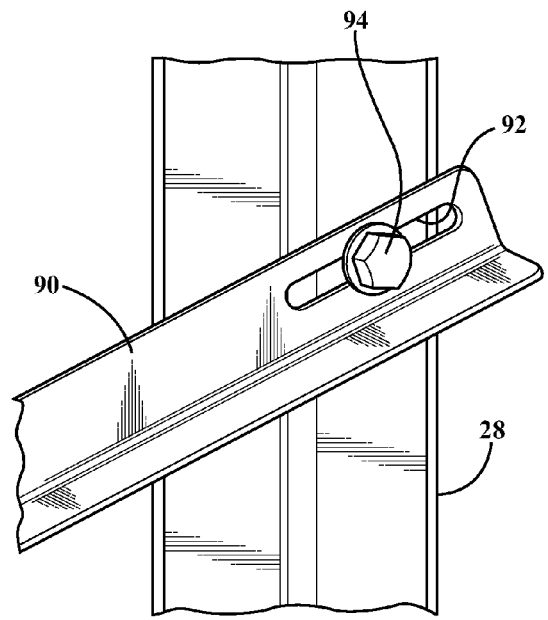
FIG. 9A is a schematic illustration of a connection of one end of a rear support brace to a rear leg member in accordance with an aspect of the disclosure.
Figure 9B:
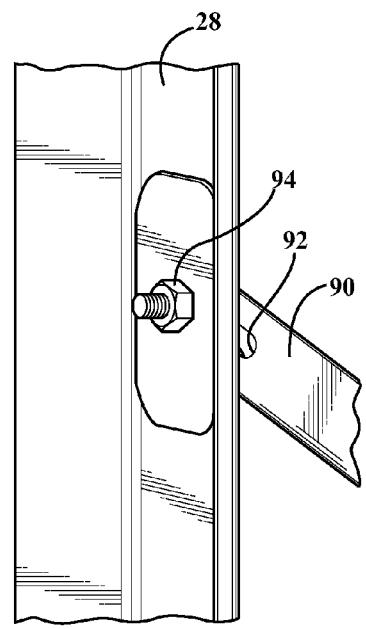
FIG. 9B is a schematic illustration of a connection of another end of a rear support brace to a rear leg member in accordance with an aspect of the disclosure.

The components that make the mounting system 20 may be formed of a variety of different materials and may have a variety of different configurations. According to an aspect, as shown in FIGS. 5 and 6, the front leg members 26 and the rear leg members 28 may each employ generally lipped c-shapes. Additionally, as shown in FIG. 7, according to another aspect, the north-south members 22 may have a generally lipped c-shape. According to a further aspect, as shown in FIG. 4, the east-west members 24 can have an open parallelogram shape. According to another aspect shown in FIG. 6, the diagonal reinforcements 30 may have a lipped c-shape. According to a still further aspect, as shown in FIGS. 9A and 9B, the rear support braces 90 may have an l-shape. It will be understood that the illustrated shapes of these structures are merely exemplary and these structures can be formed in a multitude of other shapes and configurations as desired. Also, according to an aspect, the components may be formed of suitable metal material. However, a variety of other suitable materials may be employed.

FIG. 5 through 10 illustrate the various connections that exist to assemble the various individual components of the mounting structure 20 according to an aspect of the disclosure. It will be understood that the structures effectuating the connections are intended to be friction-type bolted connections. However, other suitable connecting structures may be employed. According to an aspect, the fasteners may be M10 bolts with appropriate backing plates. According to another aspect, the M10 bolts can be torqued to 65 Nm. It will be appreciated that other suitable attachment structures may also be employed having a variety of different characteristics and specifications.

Referring now to FIGS. 5 and 6, the connection of the leg members 26, 28 to the foundation structure 50 is schematically illustrated. While the connection is described in connection with the front leg members 26, however, the description applies equally to the connection of the rear leg members 28, as shown in FIG. 6. According to an aspect, the connection may effectuated by a mounting bracket 52 that allows for the connection of the front leg member 26 at a lower end to the foundation structure 50. According to another aspect, the mounting bracket 52 may be generally c-shaped and fit around the exterior perimeter of the front leg member 26. According to a further aspect, a fastening structure 54 may pass through a back portion 56 of the mounting bracket 52 to secure it to the front leg member 26. The back portion 56 may include an elongated vertical slot 58 that allows a fastening structure 54 to couple the mounting bracket 52 to the front leg member 26. The fastening structure 54 may consist of a bolt and a backing plate with nuts. The vertical slot 58 can help compensate for any tolerances that may result from the manufacture of the components that make up the mounting structure 20 by allowing the opening or openings in the front leg member 26 to align with the vertical slot 58 for receipt of the bolt therethrough. Instead of a slot 58, another suitable opening configured to allow for the compensation of tolerances may be employed. According to a further aspect, the slot 58 allows for up-down adjustment as well as some angular adjustment of the front leg member 26.

The mounting bracket 52 may also include a base portion 60 for abutting the foundation structure 50. Another fastening device 64 may pass through an opening 62 in the base portion 60 to securely connect the front leg 26 to the foundation structure 50. According to an aspect, the foundation structure 50 can consist of helical pilings. However, other suitable structures may also be utilized. The opening 62 can consist of an elongated horizontal slot that again allows easier alignment with an opening in the foundation structure 50 such that any manufacturing tolerances or other variances are taken into account and do not interfere with the proper assembly of the components. Instead of a slot 62, another suitable opening configured to allow for the compensation of tolerances by side adjustment may be employed.

FIG. 6 also illustrates the connection of the diagonal reinforcement 30 to the rear leg member 28. According to an aspect, as shown, a bracket 100 can be employed to secure the rear leg member 28 to the diagonal reinforcement 30. The bracket 100 may include one or more openings 102 that are intended to align with openings 104 in the lower end of the rear leg member 28. One or more fastening devices 106 can be utilized to secure the bracket 100 to the rear leg member 28. According to an aspect, the openings 102 or openings 104 may consist of an elongated slot or be otherwise enlarged to allow for the compensation of tolerances. According to another aspect, the bracket 100 may also include one or more openings 108 that are intended to align with openings 112 in a lower end 110 of the diagonal reinforcement 30. One or more fastening devices 114 can be utilized to secure the bracket 100 to the diagonal reinforcement 30. According to a further aspect, the openings 108, 112 may consist of an elongated slot or be otherwise enlarged to allow for the compensation of tolerances.

FIG. 7 illustrates the connection of each of the front leg members 26 and the rear leg members 28 to the north-south members 22. The connection is described with respect to the front leg members 26, however the description applies equally to the attachment of the rear leg members 28 to the north-south member 22. As shown, one or more openings 70 may exist in each of the front leg members 26 and the north-south members 22 to allow a fastening device 72 to effectuate a connection therebetween and secure the front leg members 26 to the north-south members 22. The fastening device 72 can include a pair of bolts 74 and a backing plate 76. Instead of openings, one or more slots could be employed. It will be appreciated that the fastening device 72 could have a variety of different configurations. According to an aspect, the upper end 116 of the diagonal reinforcements 30 can are secured to the north-south members 22 in the same fashion as the front and rear leg members 26, 28.

Figure 8:
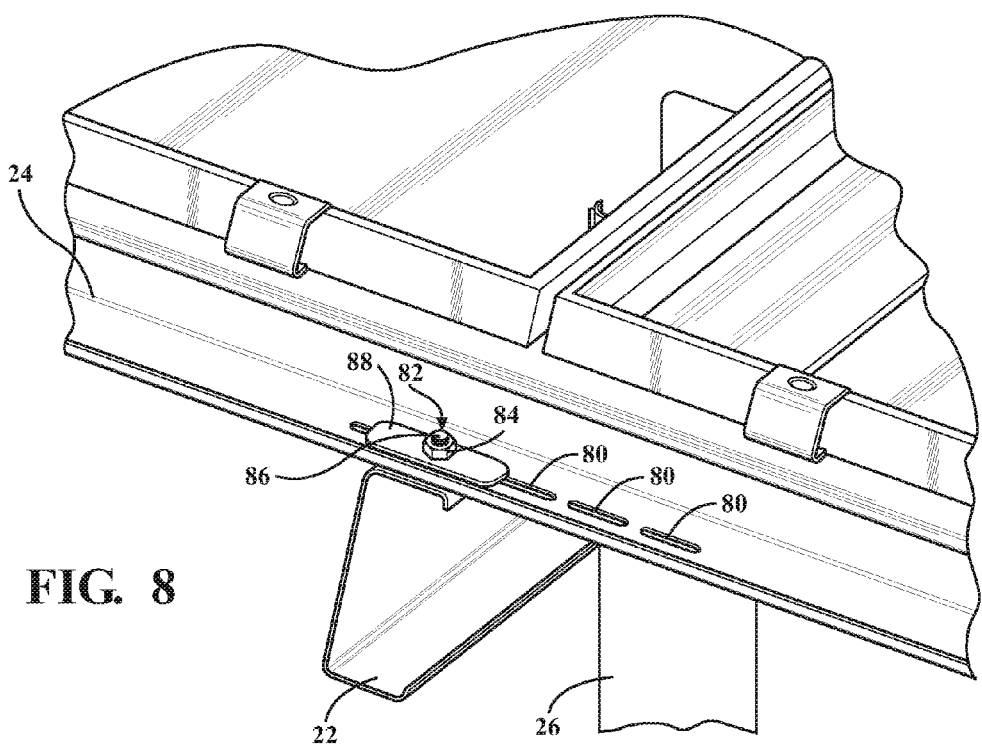
FIG. 8 is a schematic illustration of a connection of a north-south member to an east-west member in accordance with an aspect of the disclosure.

Referring now to FIG. 8 which depicts the connection of the north-south members 22 to the east-west members 24. According to an aspect, the east-west members 24 may include a plurality of slots 80 formed therein. According to another aspect, as the mounting structure 20 is assembled, one of the slots 80 may overlie an opening formed in the north-south members 22 to allow for easy attachment of the members 22, 24 to one another despite any tolerance variations that may exist as a result of the individual manufacture of the components that make up the mounting structure 20 or other variations. The securing of these structures is effectuated by a fastening device 82 that may consist of a nut 84, a bolt 86 and a backing plate 88. However, other suitable structures may be employed. The slot 80 that is utilized to receive the fastening device can vary depending upon the degree of tolerance build up. However, according to an aspect, the assembly of the mounting structure 20 will not be affected by the tolerances. Instead of slots 80 other suitable openings configured to allow for the attachment of the north-south members 22 to the east-west members 24 may be employed. Additionally, more or less slots or openings may be employed.

FIGS. 9A and 9B illustrate the connection of the rear support brace 90 to the rear leg members 28. As shown, each end of the rear support brace 90 includes an opening 92 that is intended to align with corresponding openings in adjacent rear leg member 28. According to an aspect, the openings 92 are elongated slots formed therein that provide some play such that once the rear support brace 90 is aligned with the rear leg member 28, the opening in the rear leg member 28 is accessible through the slot 92 to allow utilization of a fastening device 94, thereby in this case a bolt and nut, to secure the rear support braces 90 to each of the rear leg members 28. It will be appreciated that various different types of fastening devices may be employed to secure these structures.

Figure 10:
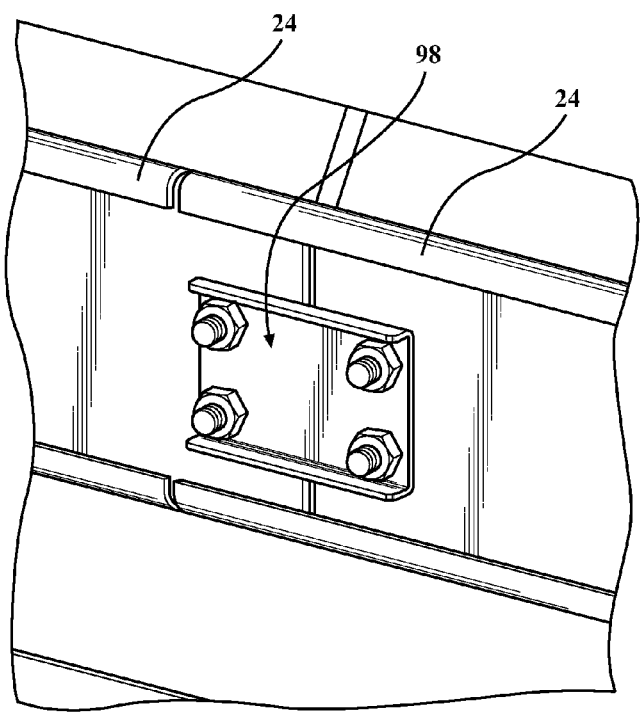
FIG. 10 is a schematic illustration of an interconnection of sections of an east-west member in accordance with an aspect of the disclosure.

As shown in FIG. 10, each east-west member 24 can consist of multiple sections. While three sections are disclosed, it will be appreciated that more or less sections can be utilized. The sections are preferably connected by a plurality of bolts and a bracket, as generally indicated by reference number 98. These sections are connected at their ends by the fastening structures that assist in integrating the sections into a single unitary east-west member 24.

Figure 11:
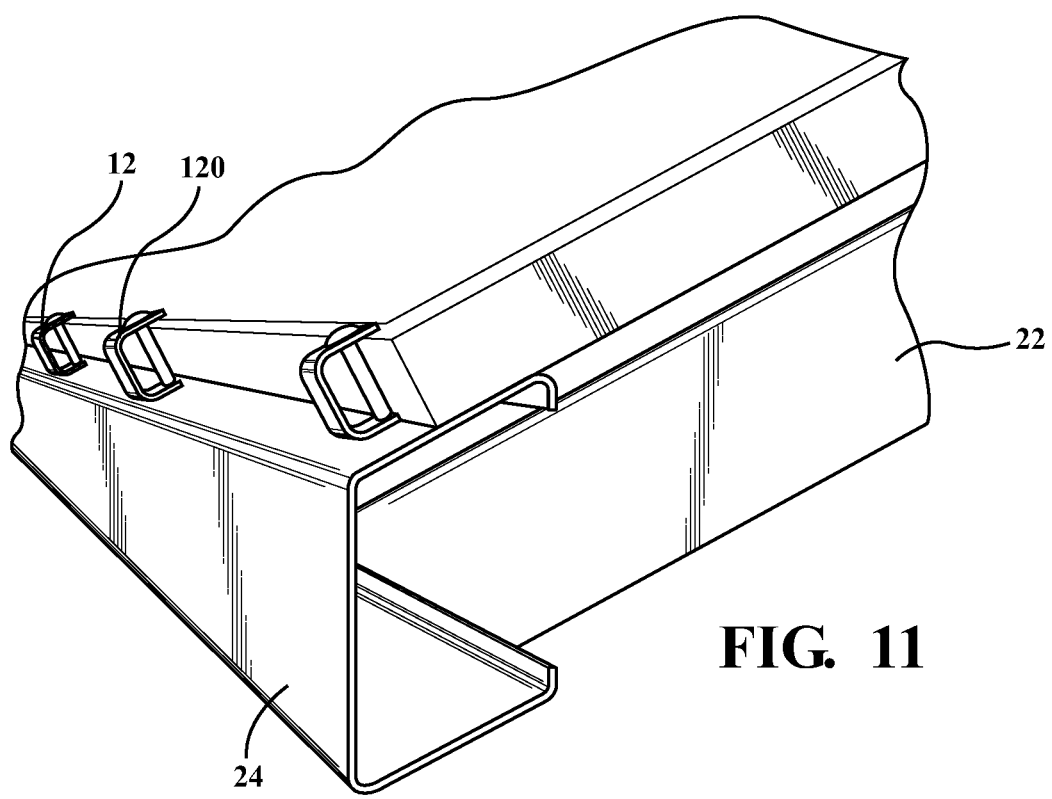
FIG. 11 illustrates a completed solar assembly in accordance with an aspect of the disclosure.

FIG. 11 generally illustrates the attachment mechanism 120 that can be employed to secure the solar panels 12 to the mounting structure 20.

Obviously, many modifications and variations of the present invention are possible in light of the above teachings and may be practiced otherwise than as specifically described while within the scope of the appended claims.

The invention claimed is:
1. A mounting structure for a solar panel assembly, comprising:
 a plurality of foundation structures attached with a ground and a plurality of mounting structures fixed with said foundation structures;
 a plurality of front support legs;
 each of said front support legs having a first height and having an upper end for supporting a solar array and having a lower end attached with one of said mounting structures;
 a plurality of rear support legs;
 each of said rear support legs having a second height that is greater than said first height and having an upper end for supporting the solar array and having a lower end attached with one of said mounting structures;
 a plurality of north-south members extending between and disposed in abutting and direct contact with an upper end of one of said plurality of front support legs and an upper end of one of said plurality of rear support legs such that each north-south member is oriented at an angle with respect to the ground;
 a plurality of east-west members connected with and extending between said north-south members;
 each of said mounting structures having a base portion disposed in abutting relationship with one of said foundation structures;
 each of said base portions of said plurality of mounting structures defining an elongated horizontal slot;
 a plurality of first fasteners each extending through one of said elongated horizontal slots in said base portions of said mounting structures to allow variable positioning of said mounting structures relative to said foundation structures in a horizontal direction within confines established by said elongated horizontal slots;
 a plurality of second fasteners extending through aligned sets of openings in said mounting structures and said support legs with one of said openings in each set being a second slot to allow variable positioning of said front and rear support legs relative to said mounting structures in a vertical direction within confines established by said second slots;
 a plurality of third fasteners extending through aligned sets of openings in support legs and said north-south members with one of said openings in each set being a third slot to allow variable positioning of said north- south members relative to said front and rear support legs within confines established by said third slots; and a plurality of fourth fasteners extending through aligned sets of openings in said north-south members and said east-west members with at least one of said openings in each set being a fourth slot to allow variable positioning of said east-west members in a lateral direction within confines established by said fourth slots.

2. The assembly of claim 1, wherein said front support legs are arranged generally in a first parallel row.

3. The assembly of claim 2, wherein said rear support legs are arranged generally in a second parallel row with said first parallel row being substantially parallel to said second parallel row.

4. The assembly of claim 1, further comprising:
   a plurality of diagonal supports that each extend between one of said plurality of rear support legs and one of said plurality of north-south members.

5. The assembly of claim 1 wherein each of said plurality of east-west members are comprised of a plurality of interconnected sections.

6. The assembly of claim 1 wherein said plurality of front and rear support legs are c-shaped, and said mounting structures are generally c-shaped to fit around each of said c-shaped front and rear support legs.

7. The assembly of claim 1 wherein said plurality of north-south members are c-shaped.

\* \* \* \* \*